(12) United States Patent
Josenhans

(10) Patent No.: US 6,745,182 B2
(45) Date of Patent: Jun. 1, 2004

(54) METHOD FOR SEARCHING FOR DATA IN AT LEAST TWO DATABASES, AND DATABASE SYSTEM HAVING AT LEAST TWO DATABASES

(75) Inventor: Michael Josenhans, Ellerbeck (DE)

(73) Assignee: Nokia Mobile Phones Ltd., Espoo (FI)

( * ) Notice: Subject to any disclaimer, the term of this patent is extended or adjusted under 35 U.S.C. 154(b) by 375 days.

(21) Appl. No.: 09/867,738

(22) Filed: May 30, 2001

(65) Prior Publication Data

US 2002/0078013 A1 Jun. 20, 2002

(30) Foreign Application Priority Data

Jun. 2, 2000 (DE) .......................... 100 27 523

(51) Int. Cl.[7] .............................. G06F 17/30; G06F 7/00
(52) U.S. Cl. ............................................... 707/4; 707/10
(58) Field of Search ................................ 707/3, 5, 100, 707/102, 104.1; 345/700

(56) References Cited

U.S. PATENT DOCUMENTS

| | | | | |
|---|---|---|---|---|
| 4,453,217 A | | 6/1984 | Boivie ............................ 707/5 |
| 5,483,586 A | * | 1/1996 | Sussman ................. 379/218.01 |
| 5,659,732 A | | 8/1997 | Kirsch ............................ 707/5 |
| 5,727,046 A | * | 3/1998 | Almulla .................... 379/88.16 |
| 5,903,632 A | | 5/1999 | Brandon ................... 379/93.23 |
| 5,966,710 A | * | 10/1999 | Burrows ................. 707/103 R |
| 6,049,796 A | * | 4/2000 | Siitonen et al. ................. 707/3 |
| 6,504,925 B1 | * | 1/2003 | Schlachman et al. ........ 379/354 |
| 6,557,004 B1 | * | 4/2003 | Ben-Shachar et al. ...... 707/102 |

FOREIGN PATENT DOCUMENTS

| | | | |
|---|---|---|---|
| EP | 0295876 | 12/1988 | |
| EP | 0855822 A2 * | 7/1998 | .......... H04M/1/274 |
| EP | 0915604 A2 * | 12/1999 | .......... H04M/1/274 |
| WO | WO 99/55058 | 10/1999 | |

OTHER PUBLICATIONS

Chan Choong Wah; Low Kln Kiong; Ee Chong Gay; Fong Mo–Han; "Distributed Staff Directory for a Campus", Networks, 1993 Proceedings of IEEE Singapore International Conference, vol: 2, Sep. 6–11, 1993, pp. 740–743.*

Cappi, Michael, "System and Method fro Creating a Virtua; Data Warehouse", Pub.No. US 2002/0038308 A1, Mar. 28, 2002, p. 1–32.*

Dye, Lee "Super Search Engine Would Simplfy the Hunt for Information", The Los Angeles Times, Oct. 4, 1999, p. 5.*

Powell, James E., "Let METZ Manage your Phone Lists— METZ Phones 6.0", Windows Magazine, Aug. 1, 1997, v.8 n8 p.163.*

* cited by examiner

Primary Examiner—Greta Robinson
Assistant Examiner—Susan F. Rayyan
(74) Attorney, Agent, or Firm—Perman & Green, LLP

(57) ABSTRACT

A method and system for searching for data in at least two databases. To allow simultaneous access to two or more databases, a search term is entered. On the basis of the entered search term, the predecessor or a plurality of predecessors and the successor or a plurality of successors to the search term and, if available, the search term itself from each of the databases are stored in a search table, and the search term, if stored in the search table, or that term from the successors stored in the search table which comes closest after the entered search term is displayed.

18 Claims, 2 Drawing Sheets

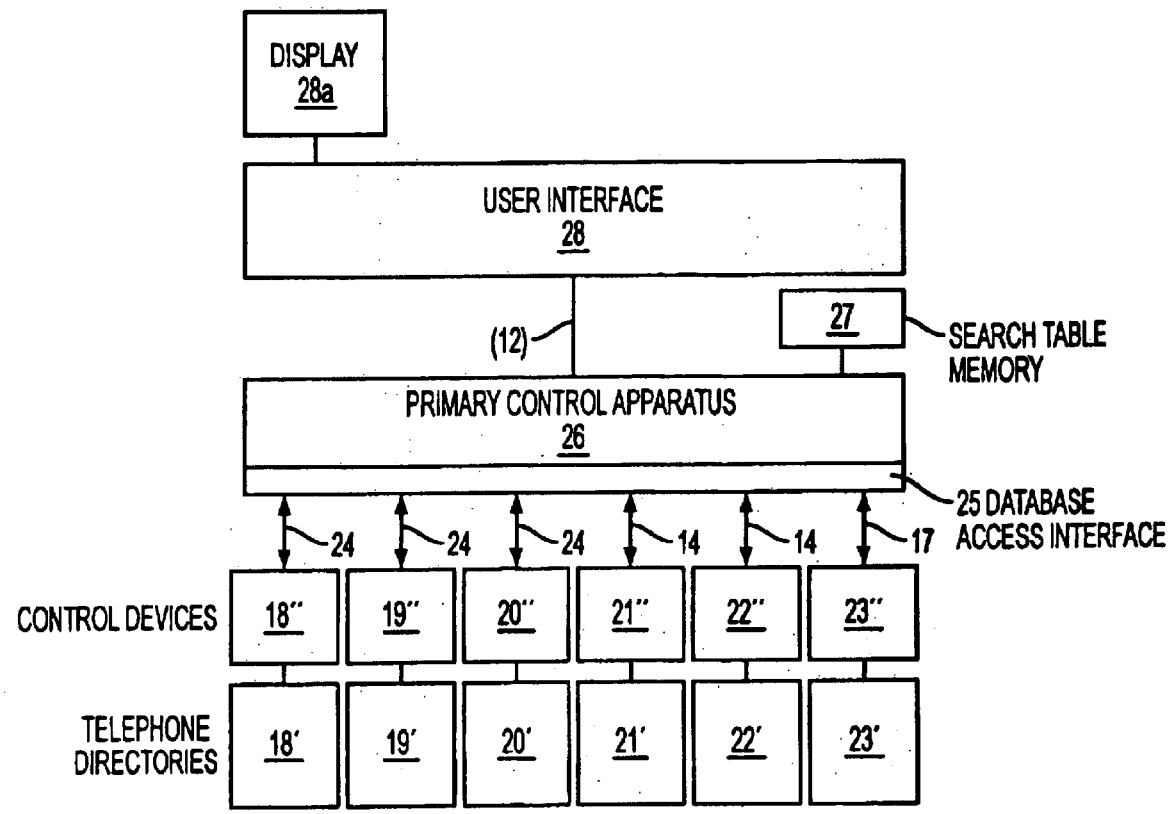

METHOD FOR SEARCHING FOR DATA IN AT LEAST TWO DATABASES, AND DATABASE SYSTEM HAVING AT LEAST TWO DATABASES

BACKGROUND OF THE INVENTION

1. Field of the Invention

The invention relates to a method for searching for data in at least two databases, in particular for searching for telephone directory, address book or appointments diary entries or the like in at least two telephone directory, address book or appointments diary databases or the like, and also to a database system having at least two databases which is particularly suitable for carrying out the inventive method for searching for data.

2. Brief Description of Related Developments

As electronic devices such as mobile telephones, that is to say car telephones and 'mobiles', cordless telephones, which communicate via a base station connected to the landline network, electronic notebooks and PCs, which contain databases, such as personal telephone directories, appointments diaries, personal address books, task lists and the like, become more and more widespread, there is the increasing problem that a user needs to manage various electronic telephone directories and/or electronic appointments diaries. If a user uses a cordless telephone with an electronic telephone directory at home in his apartment, for example, then the electronic telephone directory primarily stores private telephone numbers, whereas his work mobile primarily stores work telephone numbers. Further telephone directory entries may be stored in the car telephone, and if he additionally uses a private mobile telephone or mobile as well, this contains further, private and work telephone numbers. In this context, important telephone numbers are frequently stored in a plurality of communication devices used by the user, while other telephone numbers can be found only in a single one of the personal telephone directories in each case. In addition, the user may also have access to electronic telephone directories in his private and/or workplace PC.

In addition, a lot of mobile telephones operated with a SIM card (subscriber identity module) have the facility to store telephone directory entries either in the memory of the SIM card or in a further memory of the appliance itself. This is the case with the Nokia 9110 Communicator, for example. While the SIM card can hold 125 entries in the case of the current prior art, several 100 to several 1000 entries can be made in the memory area of the Nokia 9110 Communicator, depending on the additional memory used.

Parallel access to the various memory areas or the various electronic telephone directories is currently not possible, which means that a user must either constantly coordinate all his available telephone directories with one another if he wants to have all telephone numbers constantly available, or he needs to search through the individual electronic telephone directories one after the other. The problem described in this case in connection with electronic telephone directories with mobile and cordless telephones also concerns, by way of example, address books, appointments diaries and other databases which are provided in PCs, electronic appointments diaries and planners and the like, however.

DE 196 44 104 C1 discloses a communication device which has a main data memory in a mobile telephone and has a call number memory in a voice dialling unit connected to the mobile telephone by means of a cable. In this context, the main data memory serves as a database for a personal telephone directory, while the call number memory stores some of the data recorded in the personal telephone directory, which data can be used to access the telephone directory entries in order to select a stored telephone number. In this case, the main data memory has access to the call number memory and is able to change and/or add to entered data in order to ensure that the telephone numbers stored in the main data memory can be reliably accessed using the call number memory.

It is not necessary to search through the two interconnected memories simultaneously in this case, since the call number memory does not represent another personal telephone directory, but rather only a data list which stores for telephone directory entries in the main data memory the name of the entry and the memory location.

Against this background, the invention is based on the object of providing a method and a database system of the type mentioned in the introduction which allows simultaneous access to two or more databases in order to be able to perform a search therein as in a single database.

This object is achieved by the method according to Claim 1 and by the database system according to Claim 9. Advantageous developments of the method and of the database system are described in the respective subordinate subclaims.

SUMMARY OF THE INVENTION

The inventive method is distinguished in that, following entry of a search term, on the basis of the entered search term, the predecessor or a plurality of predecessors and the successor or a plurality of successors to the search term and, if available, the search term itself from each of the databases are stored in a search table, and the search term, if stored in the search table, or that term from the successors stored in the search table which comes closest after the entered search term is displayed. In this context, it is particularly advantageous for the displayed successor to be used as a search term for updating the search table.

According to the invention, a search table is thus set up in which, for each connected database, at least the immediate predecessor and the immediate successor to the entered search term and, if the search term itself has likewise been found in the database, the search term itself are also stored. If the search term itself has not been found in any of the connected databases, then, among the immediate successors stored in the search table, the one selected is that which comes closest after the search term. This selected successor is then displayed to a user. On the basis of this, the user can then display the next term or the previous term. He thus has the impression that he is searching for the desired information in a single database. This allows the user to search in various databases just as simply as when searching in a single database.

Another fundamental advantage of the inventive method is that, of the individual databases, in each case only the entries which come closest to the entered search term need be transferred from the database to the search table. This is particularly advantageous if the individual databases are stored in different electronic devices which communicate with one another only via communication links. In this case, the transfer time is significantly reduced, so that the electronic appliance which controls the search on the basis of the entry by the user reacts very quickly to the user entry, which represents a high level of convenience of use. Another advantage is that the search table requires only relatively little memory space, since, in the simplest case, each connected database requires only three memory locations for storing the respective names or terms, and only one memory location is required for storing the database entry associated with the respective term displayed.

The inventive method is thus suitable for searching in databases particularly where, despite low memory capacities and low data transfer rates, it is necessary to search a plurality of databases quickly so that the user feels as though he is searching through a single database.

Since, in the event of the entered search term not having been found in one of the databases, the displayed successor to the search term is used as the new search term for updating the search table, the search becomes not only even faster for the user, but also more convenient, since the search is performed in the precise order of sorting, that is to say in alphabetical order when searching for names in telephone directory or address book databases, for example. According to the invention, the search is performed as though all the available databases were to form a single database sorted on the basis of the selected sorting criterion, that is to say alphabetically, for example.

Once the search term or its closest succeeding successor has been displayed, the displayed term can either be selected in order to display and/or select for further processing the data associated therewith, or a new search term can be determined for continuing the search. In this context, a new search term is expediently determined by cycling or scrolling through the terms stored in the search table. In this case, the new search term selected is expediently the next predecessor or the next successor to the displayed term from the search table.

In one advantageous refinement of the invention, only the respective predecessors and successors to the search term in the connected databases and also, if available, the search term itself are stored in the search table in response to a search query, and the data associated with a search term are read from the appropriate database and stored only for the term displayed, in order that they may be displayed and/or processed further upon request.

For the purpose of further simplifying and accelerating the display of the database entries once the desired search term has been found, it is advantageous if each term stored in the search table has an associated unique identification number, where, for the purpose of reading the data associated with a displayed term from the appropriate database, the identification number of the displayed term is transmitted with a read request.

One option in accordance with another refinement of the inventive method is that, together with the respective predecessors and the successors to the search term and also, if available, with the search term itself, the associated data from the connected databases are also stored in the search table in response to a search query in order that they may be displayed and/or processed further upon request. This refinement of the method is particularly advantageous if the relatively high data transfer rates between the databases and the search table are possible, and the search table itself has sufficient memory space available.

The invention makes it possible to search simultaneously, quickly and conveniently in two or more databases by combining the databases into one database system in which each of the databases has an associated database control device.

In this case, the database system also comprises a database primary control apparatus which can be connected to the database control devices for the purposes of transmitting data and control commands to the database control devices and receiving them therefrom, and which has an associated search table memory which is able to store data transmitted from the database control devices, and a user interface which is connected to the database primary control apparatus and via which search terms and control commands can be entered for the purpose of simultaneously searching for data in all the connected databases, and via which terms and data found during the search in the connected databases can be output.

One advantageous provision is that the database primary control apparatus is connected to a database access interface to which the database control devices of the databases can be connected for the purpose of interchanging data and control commands using communication links. In this case, the communication links provided may be radio links, such as radio-frequency interfaces operating at radio frequencies, e.g. with a short range on the basis of a Bluetooth standard, with a long range on the basis of the GPRS (General Packet Radio Service) or UMTS standard (Universal Mobile Telecommunication Service), infrared links or else wired links.

The invention can, in principle, be used for all databases whose entries can be clearly organized in any form using "less than", "equal to" and "greater than". On the basis of the main area of application of the present invention, namely communication, provision is made for the databases to be telephone directory, address book and/or appointments diary databases.

In this case, it is particularly expedient if the databases are provided on various apparatuses, at least one of which is a telephone, in particular a mobile telephone, with the database primary control apparatus being provided in the telephone, in particular in the mobile telephone. In this case, the user interface of the telephone, that is to say its various input and output facilities, such as keypad and possibly voice command input unit and also screen and voice output unit, can be used as the user interface for the database system.

In another development of the invention, a plurality of database primary control apparatuses are provided, each of which is arranged in a different apparatus.

BRIEF DESCRIPTION OF THE DRAWINGS

The invention is explained in more detail below by way of example with reference to the drawing, in which:

FIG. 3 shows a schematic block diagram of the inventive database system, and FIGS. 4a to 4c show tables to illustrate database entries in various databases.

In various figures of the drawing, mutually corresponding elements are provided with identical reference symbols.

DETAILED DESCRIPTION OF THE PREFERRED EMBODIMENT(S)

Figure 1:
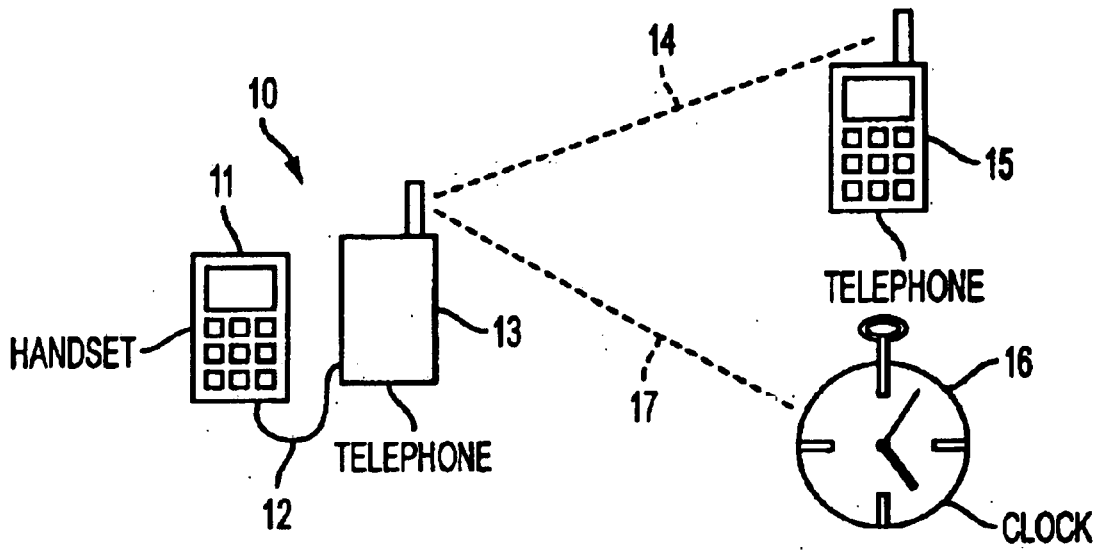
FIG. 1 is a schematic illustration of a plurality of electronic appliances which communicate with one another and contain databases.

FIG. 1 shows two mobile telephones, namely a car telephone 10 with a handset 11 connected to a telephone 13 by means of a line 12, and a 'mobile', called mobile telephone 15 below. The mobile telephone 15 is connected to the car telephone 10 via radio interface 14, in particular via a digital radio interface. In addition, a clock 16 is provided as a further electronic appliance with a database, said clock containing an electronic notebook which also comprises a telephone directory database. The telephone notebook in the clock 16 is connected to the car telephone 10 via a further radio interface 17.

Figure 2:
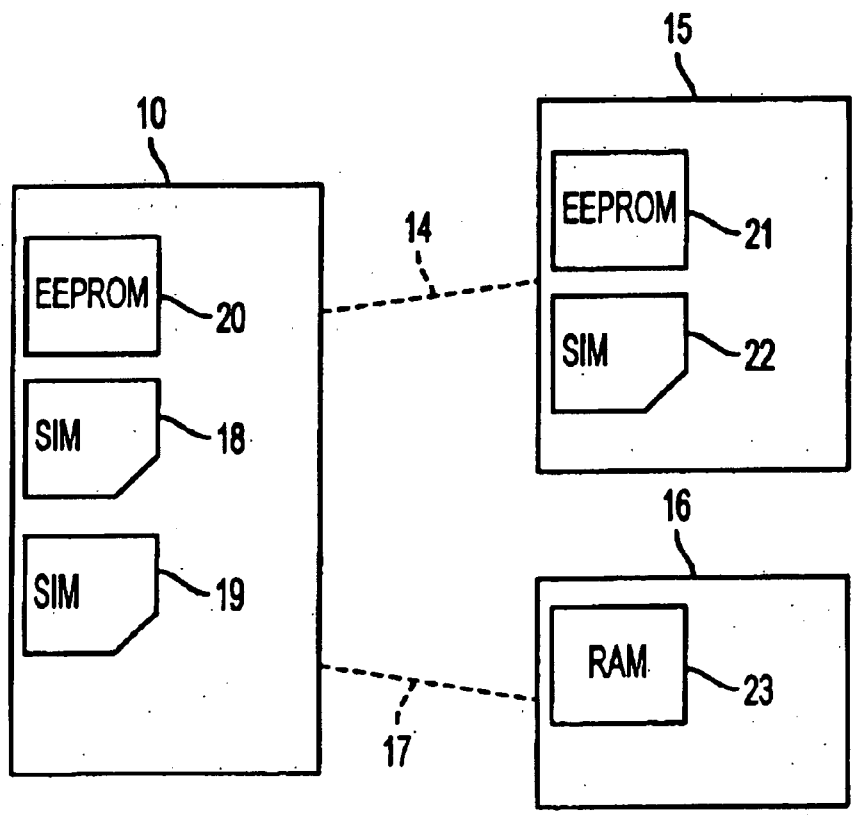
FIG. 2 shows a schematic block diagram of the arrangement of the individual database memories in the electronic appliances.

As FIG. 2 shows schematically, the car telephone 10 contains three memories on which telephone directory databases, called telephone directory or directories for short below, are recorded. A SIM card 18 in the handset 11 and a SIM card 19 in the telephone 13 and also a memory 20 of the telephone 13, for example in the form of an electronically erasable, programmable read-only memory (EEPROM), store three different telephone directories physically separately from one another. The mobile or mobile telephone 15 comprises two telephone directories, one of which is stored in the memory 21 of the mobile telephone set itself and the other of which is stored on the SIM card 22. The clock 16 comprises a static memory 23 with random access (static RAM), in which a further personal telephone directory is stored.

The telephone directories 18', 19', 20', 21', 22', 23' stored on the SIM cards 18, 19, 22 and in the memories 20, 21, 23 have associated database control devices, called control devices 18", 19", 20", 21", 22", 23" for short below. The control devices 18", 19" 20" for the telephone directories 18', 19', 20' of the car telephone 10 are connected by means of wired links 24 to a database or telephone directory access interface 25 which sets up data transfer links between the control devices 18"–23" and a central database primary control apparatus 26.

The primary control apparatus 26, which is accommodated in the car telephone 10 in the exemplary embodiment shown, is connected to a search table memory 27 and to a user interface 28 which can include a display 28a, which in this case is formed by the user interface of the handset 11.

Alternatively, the primary control apparatus 26 may be provided together with the search table memory 27 in the mobile telephone 15. In this case, the user interface of the mobile telephone 15 then serves as user interface 28. It is also possible for two primary control apparatuses 26 to be provided, which can then be used to access the telephone directories 18'–23' virtually simultaneously.

The inventive method is explained by way of example below using a search in three telephone directories 18', 19', 20'. FIGS. 4a to 4c show the entries in the telephone directories 18', 19', 20' as names of German, Finnish and American cities. For the sake of clarity, the telephone numbers of the telephone directory entries are not shown.

If, by way of example, the telephone directory entry for SAN FRANCISCO is to be ascertained in the telephone directories 18'–20', then it is possible either to enter SAN on its own or the full name SAN FRANCISCO as search term using the user interface 28 of the primary control apparatus 26. The primary control apparatus 26 checks or has already checked which telephone directories 18'–23' are available. To this end, it preferably checks which telephone directories are registered. In this context, the primary control apparatus 26 establishes, as presupposed in this case, that only the telephone directories 18'–20' are connected.

The primary control apparatus 26 then transmits a search query via the access interface 25 to the control devices 18"–20" for the character sequence SAN, simply called the search term below. For the search term SAN, the control device 18" ascertains MUNICH as the previous entry and BERLIN as the next entry in the telephone directory 18'. Accordingly, the control device 19" finds SALO as the previous entry and SANGINJOKI as the next entry in the telephone directory 19', while the control device 20" finds NEW YORK as the previous entry and SAN FRANCISCO as the next entry. The control devices 18", 19", 20" then supply the primary control apparatus 26 with the names or terms which have been found together with a unique identification number. The names or terms for the telephone directory entries found are stored together with the unique identification number (not shown) in a search table in the search table memory 27, as shown in the table below.

TABLE I

| Search direction | EEPROM | SIM 1 | SIM 2 |
|---|---|---|---|
| Previous | NEW YORK | SALO | MUNICH |
| Current | — | — | — |
| Next | SAN FRANCISCO | SANGINJOKI | BERLIN |

Since the search term SAN has not been found as such in any of the telephone directories 18'–20', as indicated by dashes in the search direction row current, the closest successor to the search term SAN, that is to say SAN FRANCISCO, is ascertained by the primary control apparatus 26 and is transmitted to the user interface 28, which displays this found term as the name of the telephone directory entry.

At the same time, the primary control device 26 asks the control device 20" for the telephone directory 20' in which the displayed term has been found to transmit the full telephone directory entry and then also to transmit the previous and next entries for the search term SAN FRANCISCO. To this end, the primary control device 26 transmits the unique identification number to the relevant control device. The telephone directory entry for SAN FRANCISCO is then stored either together with the term as such in the search table, or in a memory provided specifically for this purpose. In addition, the search table is updated for the displayed search term SAN FRANCISCO, so that the search table below results.

TABLE II

| Search direction | EEPROM | SIM 1 | SIM 2 |
|---|---|---|---|
| Previous | NEW YORK | SALO | MUNICH |
| Current | SAN FRANCISCO | — | — |
| Next | SAN JOSE | SANGINJOKI | BERLIN |

If the user now wants to cycle or scroll through the telephone directories starting with the telephone directory entry SAN FRANCISCO which is displayed to him, he is able to use appropriate search keys, rotary knobs or the like to enter the search direction previous or next. If he selects next, then the primary control apparatus 26 finds the term SANGINJOKI in the search table as the closest successor to the search term SAN FRANCISCO and displays said term SANGINJOKI. At the same time, the term SANGINJOKI is transmitted to the control devices 18"–20" in order to establish the associated previous and next terms. In addition, the primary control apparatus 26 asks the control device 19" to transmit the full telephone directory entry for SANGINJOKI. Following updating, the search table below is produced.

TABLE III

| Search direction | EEPROM | SIM 1 | SIM 2 |
| --- | --- | --- | --- |
| Previous | SAN FRANCISCO | SALO | MUNICH |
| Current | — | SANGINJOKI | — |
| Next | SAN JOSE | TURKU | BERLIN |

If the search direction next is then selected, the new search term produced is SAN JOSE, while, for the search direction previous, the term SAN FRANCISCO would again be found. If, however, the previous term is selected on the basis of search table II, the new search term becomes SALO, and the search table below is produced.

TABLE IV

| Search direction | EEPROM | SIM 1 | SIN 2 |
| --- | --- | --- | --- |
| Previous | NEW YORK | OULO | MUNICH |
| Current | — | SALO | — |
| Next | SAN FRANCISCO | SANGINJOKI | BERLIN |

If the user continues to cycle or scroll in the direction previous, the new search term produced is OULO, for which the predecessor and successor are then sought in the telephone directory 19' from which the new search term originates, and the primary control apparatus 26 retrieves the telephone directory entry from the telephone directory 19' using the control device 19".

TABLE V

| Search direction | EEPROM | SIM 1 | SIM 2 |
| --- | --- | --- | --- |
| Previous | NEW YORK | NOKKA | MUNICH |
| Current | — | OULO | — |
| Next | SAN FRANCISCO | SALO | BERLIN |

It is thus evident that the inventive method can be used to cycle through a plurality of telephone directories as through a single telephone directory organized alphabetically. The user is thus accessing a virtual telephone directory which contains the entries from all connected telephone directories in strictly alphabetical order. If the primary control apparatus has a sufficiently large search table memory 27 available, it is also possible to ascertain not one predecessor and one successor to the search term for each telephone directory, but rather two or more predecessors and two or more successors, and to store them in the search table memory 27, which allows the response speed of the inventive method to be increased further.

With an appropriately high storage capacity and high data transfer rates between primary control apparatus 26 and the control devices 18"–23", it is also possible for not only the names of the telephone directory entries but the full telephone directory entries for the predecessor and successor to be transferred and stored in the search table memory. In this case, it would also be possible for not just the name of the telephone directory entry but also, at the same time, the associated telephone number to be displayed to the user.

The inventive method can also be applied to searching for telephone numbers, with it simultaneously being possible for filters to be provided which allow only telephone numbers having a particular country and/or town dialling code to be displayed. This makes it possible, by way of example, to display only telephone numbers having the dialling code 0049 234 for Bochum or having dialling code 0049 89 for Munich, in order to find existing contacts in Bochum or Munich.

The search described can also be applied to entries in an appointments diary database, since it is possible for both date and time to be clearly sorted on the basis of "earlier", "now" and "later", which corresponds to the terms "less than", "equal to" and "greater than".

The inventive database system may also be extended in a simple manner by connecting additional telephone directory databases, so long as the capacity of the search table memory 27 is sufficient. If, by way of example, the mobile telephone 15 is brought into the area of the car telephone 10, so that the radio interface 14 can be used to interchange data between the mobile telephone 15 and the car telephone 10, the control devices 21", 22" for the telephone directories 21', 22' register with the primary control apparatus 26, which then also includes the newly registered telephone directories 21', 22' when subsequently searching in the telephone directories. If the link between the car telephone 10 and the mobile telephone 15 is interrupted, then the primary control apparatus 26 establishes that the telephone directories 21', 22' are no longer available, and searches only in the connected telephone directories, as described above.

If a database, e.g. the telephone directory 23', is registered in a database system by its control device 23" while a search is being carried out in the databases or telephone directories, that is to say while a user is scrolling through the databases or telephone directories, the primary control apparatus 26 transmits, in response to registration of the database or of the telephone directory 23', the current search term together with a search query to the control device 23", which then performs a corresponding search in the telephone directory 23' and transmits the terms found in the course of this back to the primary control apparatus 26 for the purpose of writing them into the search table, where these terms are handled in the same manner as the others. The inventive method thus permits a smooth search in the databases of a database system even when databases are being added or removed.

The present invention thus makes it possible for a user to search through his various personal telephone directories or other databases as a single telephone directory or a single database. This seamless integration of the various telephone directories or databases to form a virtual telephone directory or a virtual database considerably simplifies handling of the telephone directories. The structure of the inventive method makes it possible to perform an effective search with little data transfer and little standby involvement. In particular, it is not necessary for the design of the database system to involve the data contents of the connected databases first being fully transferred to a common memory in order for a search then to be carried out there. This significantly reduces the start-up time from switching on the system up to being ready to search. In addition, only relatively little main memory is required, since only a small number of telephone directory entries, preferably only a single telephone directory entry, need be transferred completely from the telephone directory database to the main memory.

All types of communication links, in particular radio links and infrared links and also wired links, which are used particularly when two or more database memories are arranged physically separately from one another in an appliance, such as in a car telephone or a mobile telephone, are suitable for the design of the inventive database system.

What is claimed is:

1. A Method for searching for data in at least two databases (18'–23'), in particular for searching for telephone directory, address book or appointment diary entries in at least two telephone directory, address book or appointment diary databases, the method comprising:

entering a search term, on the basis of the entered search term, searching for and retrieving a predecessor or a plurality of predecessors and a successor or a plurality of successors to the entered search term and, if available, the entered search term itself from each of the at least two databases (18'–23'), and storing in a search table a predecessor or a plurality of predecessors and a successor or a plurality of successors to the entered search term and, if available, the entered search term itself, and displaying the entered search term, if stored in the search table, or that term from the successor or plurality of successors stored in the search table which comes closest after the entered search term.

2. Method according to claim 1, characterized in that the displayed successor is used as a search term for updating the search table.

3. Method according to claim 1, characterized in that either the displayed term is selected in order to display or select for further processing the data associated therewith, or a new search term is determined for continuing the search.

4. Method according to claim 3, characterized in that the new search term selected is the next predecessor or the next successor to the displayed term from the search table.

5. Method according to claim 1, characterized in that only the respective predecessors and successors to the search term in the connected databases and also, if available, the search term itself are stored in the search table in response to a search query, and in that the data associated with a search term are read from the appropriate database (18'–23') and stored only for the term displayed, in order that they may be displayed or processed further upon request.

6. Method according to claim 1, characterized in that each term stored in the search table has an associated unique identification number.

7. Method according to claim 6, characterized in that, for the purpose of reading the data associated with a displayed tern from the appropriate database, the identification number of the displayed term is transmitted with a read request.

8. Method according to claim 1, characterized in that, together with the respective predecessors and the successors to the search term and also, it available, with the search term itself, the associated data from the connected databases are also stored in the search table in response to a search query in order that they may be displayed or processed further upon request.

9. A database system, for searching for data in at least two databases (18'–23'), in particular for searching for telephone directory, address book or appointment diary entries in at least two telephone directory, address book or appointment diary databases comprising:

at least two databases (18'–23'), each of which has an associated database control device (18"–23"), a database primary control apparatus (26), which can be connected to the database control devices (18"–23") for the purposes of transmitting data and control commands to the database control devices (18"–23") and receiving them therefrom, and which has an associated search table memory (27) which is able to store data transmitted from the database control devices (18"–23"), and a user interface (28) which is connected to the database primary control apparatus (26) and via which search terms and control commands can be entered for the purpose off simultaneously searching for data in all the connected databases (18'–23'), and via which terms and data found during the search in the connected databases (18'–23') can be output, wherein on the basis of the entered search terms a predecessor or a plurality of predecessors and a successor or a plurality of successors to the entered search terms and, if available, the entered search terms can be searched for and retrieved from each of the at least two databases (18'–23'), and the predecessor or a plurality of predecessors and a successor or a plurality of successors to the entered search term and, if available, the entered search term itself can be stored in the search table memory; and a display coupled to the user interface for displaying the entered search terms, if stored in the search table memory, or that term from the successor or plurality of successors stored in the search table memory which comes closest after the entered search terms.

10. Database system according to claim 9, characterized in that the database primary control apparatus (26) is connected to a database access interface (25) to which the database control devices (18"–23") of the databases (18'–23') can be connected for the purpose of interchanging data and control commands using communication links (14, 24, 17).

11. Database system according to claim 10, characterized in that the communication links (14, 17) provided are radio links.

12. Database system according to claim 10, characterized in that the communication links provided are infrared links.

13. Database system according to claim 10, characterized in that the communication links (24) provided are wired links.

14. Database system according to claim 9, wherein the databases are a telephone directory, address book or appointment diary databases.

15. Database system according to claim 9, characterized in that the databases (18'–23') are provided on various apparatuses, at least one of which is a telephone (10, 15).

16. Database system according to claim 15, characterized in that the database primary control apparatus (26) is provided in the telephone (10).

17. Database system according to claim 9, characterized in that a plurality of database primary control apparatuses (26) are provided, each of which is arranged in a different apparatus.

18. The database system of claim 15 wherein the telephone is a mobile telephone.

* * * * *